US012597429B2

(12) United States Patent
Mundt et al.

(10) Patent No.: US 12,597,429 B2
(45) Date of Patent: Apr. 7, 2026

(54) PACKET LOSS CONCEALMENT

(71) Applicant: DOLBY INTERNATIONAL AB, Dublin (IE)

(72) Inventors: Harald Mundt, Fürth (DE); Stefan Bruhn, Sollentuna (SE); Heiko Purnhagen, Sundbyberg (SE); Simon Plain, Nuremberg (DE); Michael Schug, Erlangen (DE)

(73) Assignee: DOLBY INTERNATIONAL AB, Dublin (IE)

( * ) Notice: Subject to any disclaimer, the term of this patent is extended or adjusted under 35 U.S.C. 154(b) by 372 days.

(21) Appl. No.: 18/004,197

(22) PCT Filed: Jul. 7, 2021

(86) PCT No.: PCT/EP2021/068774
§ 371 (c)(1),
(2) Date: Jan. 4, 2023

(87) PCT Pub. No.: WO2022/008571
PCT Pub. Date: Jan. 13, 2022

(65) Prior Publication Data

US 2023/0267938 A1 Aug. 24, 2023

Related U.S. Application Data

(60) Provisional application No. 63/208,896, filed on Jun. 9, 2021, provisional application No. 63/049,323, filed on Jul. 8, 2020.

(51) Int. Cl.

| | |
|---|---|
| ***G10L 19/005*** | (2013.01) |
| ***G10L 19/008*** | (2013.01) |
| ***G10L 19/02*** | (2013.01) |

(52) U.S. Cl.
CPC .......... *G10L 19/005* (2013.01); *G10L 19/008* (2013.01); *G10L 19/0204* (2013.01)

(58) Field of Classification Search
CPC ..... G10L 19/00; G10L 19/005; G10L 19/008; G10L 19/204
See application file for complete search history.

(56) References Cited

U.S. PATENT DOCUMENTS

| | | | |
|---|---|---|---|
| 6,968,005 | B2 | 11/2005 | Hannuksela |
| 7,411,985 | B2 | 8/2008 | Lee |

(Continued)

FOREIGN PATENT DOCUMENTS

| | | | |
|---|---|---|---|
| CN | 107103909 | A | 8/2017 |
| CN | 109313905 | A | 2/2019 |

(Continued)

OTHER PUBLICATIONS

Bong-Ki Lee and Joon-Hyuk Chang, "Novel adaptive muting technique for packet loss concealment of ITU-T G.722 using optimized parametric shaping functions," EURASIP Journal on Audio, Speech, and Music Processing, (2016) 2016:11 DOI 10.1186/s13636-016-0089-6, 12 pages.

(Continued)

*Primary Examiner* — Sean E Serraguard

(57) ABSTRACT

Described are methods of processing an audio signal for packet loss concealment. The audio signal comprises a sequence of frames, each frame containing representations of a plurality of audio channels and reconstruction parameters for upmixing the plurality of audio channels to a predetermined channel format. One method includes: receiving the audio signal; and generating a reconstructed audio signal in the predefined channel format based on the received audio signal. Generating the reconstructed audio signal comprises: determining whether at least one frame of the audio signal has been lost; and if a number of consecu- (Continued)

tively lost frames exceeds a first threshold, fading the reconstructed audio signal to a predefined spatial configuration. Also described is a method of encoding an audio signal. Yet further described are apparatus for carrying out the methods, as well as corresponding programs and computer-readable storage media.

3 Claims, 7 Drawing Sheets

(56) References Cited

U.S. PATENT DOCUMENTS 9,026,434 B2 5/2015 Greer
9,275,644 B2 3/2016 Rajendran
9,514,755 B2 12/2016 Huang
9,520,135 B2 12/2016 Davis
10,043,523 B1 8/2018 Zopf
10,057,393 B2 8/2018 Kwok
2005/0182996 A1 8/2005 Bruhn
2005/0182998 A1 8/2005 Cucchi
2011/0191111 A1 8/2011 Chu
2011/0268280 A1 11/2011 Kawashima
2012/0207307 A1 8/2012 Engdegard
2013/0142339 A1 6/2013 Engdegard
2015/0120285 A1 4/2015 Bradley
2015/0255075 A1* 9/2015 Cheluvaraja .......... G10L 19/005 704/219
2015/0255079 A1* 9/2015 Huang ................ G10L 19/0017 704/500
2015/0371641 A1 12/2015 Bruhn
2016/0104488 A1* 4/2016 Schnabel ................ G10L 19/12 704/204
2016/0148618 A1* 5/2016 Huang ................ G10L 19/0212 381/2
2016/0240206 A1 8/2016 Purnhagen
2018/0091917 A1 3/2018 Chon
2018/0240208 A1 8/2018 Cook
2019/0237086 A1* 8/2019 Huang .................... H04S 3/008
2020/0066287 A1 2/2020 Davis
2022/0199098 A1* 6/2022 Ashour ................. G06F 17/141

FOREIGN PATENT DOCUMENTS

CN 110603820 A 12/2019
JP H07271391 A 10/1995
JP H08179795 A 7/1996
JP H09321783 A 12/1997
JP 2012159730 A 8/2012
JP 2016528535 A 9/2016
JP 2016540241 A 12/2016
WO 2005059898 A1 6/2005
WO 2008155835 A 12/2008
WO 2009157213 A1 12/2009
WO 2015003027 A1 1/2015
WO 2015008027 A1 1/2015
WO 2021252811 A2 12/2021

OTHER PUBLICATIONS

D. McGrath ; S. Bruhn ; H. Purhagen ; M. Eckert ; J. Torres ; S. Brown ; D. Darcy, "Immersive Audio Coding for Virtual Reality Using a Metadata-assisted Extension of the 3GPP EVS Codec."

PCT/EP2021/068774, EPO as IPEA, "International Preliminary Report on Patentability," mail date Jan. 19, 2023, 16 pages.

PCT/EP2021/068774, EPO as ISA, "International Search Report and Written Opinion," mail date Jan. 27, 2022, 21 pages.

Fraunhofer Institute for Integrated Circuits IIS, "Enhanced voice services (EVS) codec, " Technical Paper, Mar. 2017, Fraunhofer-Gesellschaft, Erlangen, Germany.

Jeremie Lecomte, "Packet-Loss Concealment Technology Advances in EVS," Conference Paper, Apr. 2015, pp. 5708-5712, DOI: 10.1109/ICASSP.2015.7179065.

General audio codec audio processing functions Enhanced aacPlus general audio codec Additional decoder tools. 3GPP TS 26.402 version 6.1.0 Release 6 (Sep. 2005), 19 pages.

* cited by examiner

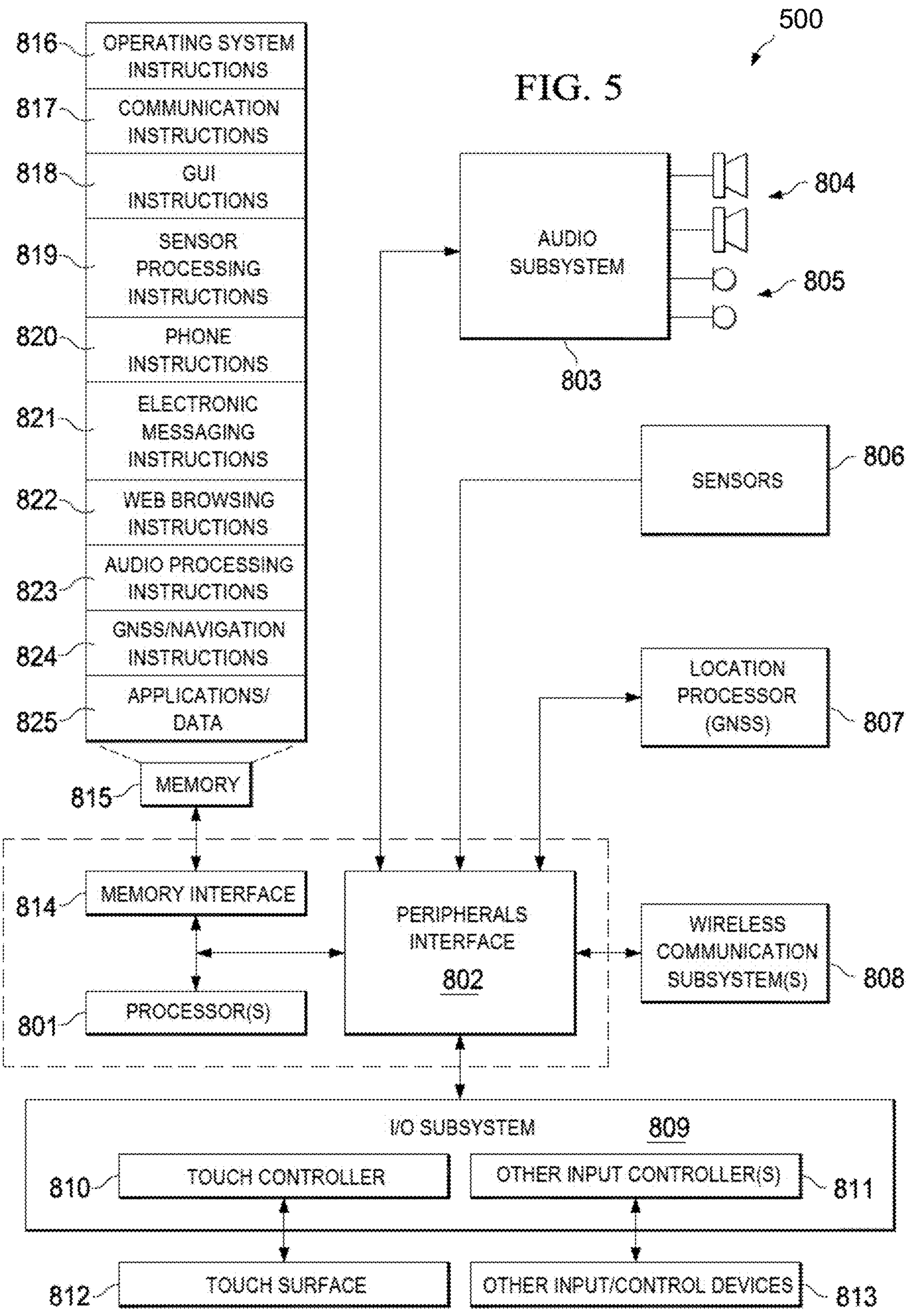
500
FIG. 5
816 OPERATING SYSTEM INSTRUCTIONS
817 COMMUNICATION INSTRUCTIONS
818 GUI INSTRUCTIONS
819 SENSOR PROCESSING INSTRUCTIONS
820 PHONE INSTRUCTIONS
821 ELECTRONIC MESSAGING INSTRUCTIONS
822 WEB BROWSING INSTRUCTIONS
823 AUDIO PROCESSING INSTRUCTIONS
824 GNSS/NAVIGATION INSTRUCTIONS
825 APPLICATIONS/ DATA
815 MEMORY
AUDIO SUBSYSTEM
803
804
805
SENSORS
806
LOCATION PROCESSOR (GNSS)
807
814 MEMORY INTERFACE
801 PROCESSOR(S)
PERIPHERALS INTERFACE
802
WIRELESS COMMUNICATION SUBSYSTEM(S)
808
I/O SUBSYSTEM
809
810 TOUCH CONTROLLER
OTHER INPUT CONTROLLER(S) 811
812 TOUCH SURFACE
OTHER INPUT/CONTROL DEVICES 813

PACKET LOSS CONCEALMENT

CROSS-REFERENCE TO RELATED APPLICATIONS

This application is a U.S. National Stage Application under U.S.C. 371 of International Application No. PCT/EP2021/068774, filed 7 Jul. 2021 (reference: D20068US01), which claims priority of the following priority applications: U.S. provisional application 63/049,323 (reference: D20068USP1), filed 8 Jul. 2020 and U.S. provisional 63/208,896 (reference: D20068USP2), filed 9 Jun. 2021, each of which are hereby incorporated by reference.

TECHNICAL FIELD

The present disclosure relates to methods and apparatus of processing an audio signal. The present disclosure further describes decoder processing in codecs such as the Immersive Voice and Audio System (IVAS) Codec in case of packet (frame) losses in order to achieve best possible audio experience. This principle is known as Packet Loss Concealment (PLC).

BACKGROUND

Audio codecs for coding spatial audio, such as IVAS, involve metadata including reconstruction parameters (e.g., Spatial Reconstruction Parameters) that enable accurate spatial constructions of the encoded audio. While packet loss concealment may be in place for the actual audio signals, loss of this metadata may result in perceivably incorrect spatial reconstruction of the audio, and hence, audible artifacts.

Thus, there is a need for improved packet loss concealment for metadata including reconstruction parameters, such as Spatial Reconstruction Parameters.

SUMMARY

In view of the above, the present disclosure provides methods of processing an audio signal, a method of encoding an audio signal, as well as a corresponding apparatus, computer programs, and computer-readable storage media, having the features of the respective independent claims.

According to an aspect of the disclosure, a method of processing an audio signal is provided. The method may be performed at a receiver/decoder. The audio signal may include a sequence of frames. Each frame may contain representations of a plurality of audio channels and reconstruction parameters for upmixing the plurality of audio channels to a predetermined (or predefined) channel format. The audio signal may be a multi-channel audio signal. The predefined channel format may be first-order Ambisonics (FOA), for example, with W, X, Y, and Z audio channels (components). In this case, the audio signal may include up to four audio channels. The plurality of audio channels of the audio signal may relate to downmix channels obtained by downmixing audio channels of the predefined channel format. The reconstruction parameters may be Spatial Reconstruction (SPAR) parameters. The method may include receiving the audio signal. The method may further include generating a reconstructed audio signal in the predefined channel format based on the received audio signal. Therein, generating the reconstructed audio signal may be based on the received audio signal and the reconstruction parameters (and/or estimations of the reconstruction parameters). Further, generating the reconstructed audio signal may involve upmixing of (the plurality of) audio channels of the audio signal. Upmixing of the plurality of audio channels to the predefined channel format may relate to reconstruction of audio channels of the predefined channel format based on the plurality of audio channels and decorrelated versions thereof. The decorrelated versions may be generated based on (at least some of) the plurality of audio channels of the audio signal and the reconstruction parameters. To this end, an upmix matrix may be determined based on the reconstruction parameters. Generating the reconstructed audio signal may also include determining whether at least one frame of the audio signal has been lost. Then, if a number of consecutively lost frames exceeds a first threshold, said generating may include fading the reconstructed audio signal to a predetermined (or predefined) spatial configuration. In one example, the predefined spatial configuration may relate to an omnidirectional audio signal. For a reconstructed FOA audio signal this would mean that only the W audio channel is retained. The first threshold may be four or eight frames, for example. The duration of a frame may be 20 ms, for example.

Configured as defined above, the proposed method can mitigate inconsistent audio in case of packet loss, especially for long durations of packet loss and provide a consistent spatial experience of the user. This may be particularly relevant in an Enhanced Voice Service (EVS) framework, in which EVS concealment signals for individual audio channels in case of packet loss may not be consistent with each other.

In some embodiments, the predefined spatial configuration may correspond to a spatially uniform audio signal. For example, for FOA the reconstructed audio signal faded to the predefined spatial configuration may only include the W audio channel. Alternatively, the predefined spatial configuration may correspond to a predefined direction of the reconstructed audio signal. In this case, for FOA one of the X, Y, Z components may be faded to a scaled version of W and the other two of the X, Y, Z components may be faded to zero, for example.

In some embodiments, fading the reconstructed audio signal to the predefined spatial configuration may involve linearly interpolating between a unit matrix and a target matrix indicative of the predefined spatial configuration, in accordance with a predetermined fade-out time. In this case, an upmix matrix for audio reconstruction may be determined (e.g., generated) based on a matrix product of a salient upmix matrix and the interpolated matrix. Here, the salient upmix matrix may be derivable based on the reconstruction parameters.

In some embodiments, the method may further include, if the number of consecutively lost frames exceeds a second threshold that is greater than or equal to the first threshold, gradually fading out the reconstructed audio signal. Gradually fading out (i.e., muting) the reconstructed audio signal may be achieved by applying a gradually decaying gain to the reconstructed audio signal, to the plurality of audio channels of the audio signal, or to any upmix coefficients used in generating the reconstructed audio signal. The gradual fading out may be performed in accordance with a (second) predetermined fade-out time (time constant). For example, the reconstructed audio signal may be muted by 3 dB per (lost) frame. The second threshold may be eight frames, for example.

This further adds to providing for a consistent user experience in case of packet loss, especially for very long stretches of packet loss.

In some embodiments, the method may further include, if at least one frame of the audio signal has been lost, generating estimations of the reconstruction parameters of the at least one lost frame based on one or more reconstruction parameters of an earlier frame. The method may further include using the estimations of the reconstruction parameters of the at least one lost frame for generating the reconstructed audio signal of the at least one lost frame. This may apply if fewer than a predetermined number of frames (e.g., fewer than the first threshold) have been lost. Alternatively, this may apply until the reconstructed audio signal has been fully spatially faded and/or fully faded out (muted).

In some embodiments, each reconstruction parameter may be explicitly coded once every given number of frames in the sequence of frames and (time-)differentially coded between frames for the remaining frames. Further, estimating a given reconstruction parameter of a lost frame may involve estimating the given reconstruction parameter of the lost frame based on the most recently determined value of the given reconstruction parameter. Alternatively, said estimating may involve estimating the given reconstruction parameter of the lost frame based on the most recently determined values of two or more reconstruction parameters other than the given reconstruction parameter. Exceptionally, said estimating may involve estimating the given reconstruction parameter of the lost frame based on the most recently determined value of one reconstruction parameter other than the given reconstruction parameter (e.g., for a reconstruction parameter relating to a frequency band that only has one neighboring frequency band). Thus, the given reconstruction parameter may be either extrapolated across time or interpolated across reconstruction parameters, or in case of reconstruction parameters of, e.g., lowest/highest frequency bands, extrapolated from a single neighboring frequency band. The differential coding may follow an (interleaved) differential coding scheme according to which each frame contains at least one reconstruction parameter that is explicitly coded and at least one reconstruction parameter that is differentially coded with reference to an earlier frame, wherein the sets of explicitly coded and differentially coded reconstruction parameters differ from one frame to the next. The contents of these sets may repeat after a predetermined frame period. It is understood that values of reconstruction parameters may be determined by correctly decoding said values.

Thereby, reasonable reconstruction parameters (e.g., SPAR parameters) can be provided in case of packet loss, in order to provide a consistent spatial experience based on, for example, the EVS concealment signals. Further, this enables to provide the best reconstruction parameters (e.g., SPAR parameters) after packet loss with time-differentially coding applied.

In some embodiments, the method may further include determining a measure of reliability of the most recently determined value of the given reconstruction parameter. The method may yet further include deciding, based on the measure of reliability, whether to estimate the given reconstruction parameter of the lost frame based on the most recently determined value of the given reconstruction parameter or based on the most recently determined values of two or more reconstruction parameters (exceptionally, a single reconstruction parameter) other than the given reconstruction parameter. The measure of reliability may be determined based on an age (e.g., in units of frames) of the most recently determined value of the given reconstruction parameter and/or the age (e.g., in units of frames) of the most recently determined values of the reconstruction parameter(s) other than the given reconstruction parameter.

In some embodiments, the method may further include, if the number of frames for which the value of the given reconstruction parameter could not be determined exceeds a third threshold, estimating the given reconstruction parameter of the lost frame based on the most recently determined values of the reconstruction parameter(s) other than the given reconstruction parameter. The method may further include otherwise estimating the given reconstruction parameter of the lost frame based on the most recently determined value of the given reconstruction parameter.

In some embodiments, each frame may include reconstruction parameters relating to respective frequency bands. A given reconstruction parameter of the lost frame may be estimated based on (one or more) reconstruction parameters relating to frequency bands different from a frequency band to which the given reconstruction parameter relates.

In some embodiments, the given reconstruction parameter may be estimated by interpolating between the reconstruction parameters relating to the frequency bands different from the frequency band to which the given reconstruction parameter relates. Exceptionally, for a frequency band at the boundary of the covered frequency range (i.e., a highest or lowest frequency band), the given reconstruction parameter of the lost frame may be estimated by extrapolating from a reconstruction parameter relating to the frequency band neighboring (or nearest to) the highest or lowest frequency band.

In some embodiments, the given reconstruction parameter may be estimated by interpolating between reconstruction parameters relating to frequency bands neighboring the frequency band to which the given reconstruction parameter relates. Alternatively, if the frequency band to which the given reconstruction parameter relates has only one neighboring frequency band, the reconstruction parameter may be estimated by extrapolating from the reconstruction parameter relating to that neighboring frequency band.

According to another aspect of the disclosure, a method of processing an audio signal is provided. The method may be performed at a receiver/decoder, for example. The audio signal may include a sequence of frames. Each frame may include representations of a plurality of audio channels and reconstruction parameters for upmixing the plurality of audio channels to a predetermined channel format. The method may include receiving the audio signal. The method may further include generating a reconstructed audio signal in the predefined channel format based on the received audio signal. Therein, generating the reconstructed audio signal may include determining whether at least one frame of the audio signal has been lost. Said generating may further include, if at least one frame of the audio signal has been lost, generating estimations of the reconstruction parameters of the at least one lost frame based on the reconstruction parameters of an earlier frame. Further, said generating may include using the estimations of the reconstruction parameters of the at least one lost frame for generating the reconstructed audio signal of the at least one lost frame.

In some embodiments, each reconstruction parameter may be explicitly coded once every given number of frames in the sequence of frames and (time-)differentially coded between frames for the remaining frames. Then, estimating a given reconstruction parameter of a lost frame may involve estimating the given reconstruction parameter of the lost frame based on the most recently determined value of the given reconstruction parameter. Alternatively, said estimating may involve estimating the given reconstruction parameter of the lost frame based on the most recently determined values of two or more reconstruction parameters other than the given reconstruction parameter. Exceptionally, said estimating may involve estimating the given reconstruction parameter of the lost frame based on the most recently determined value of one reconstruction parameter other than the given reconstruction parameter (e.g., for a reconstruction parameter relating to a frequency band that only has one neighboring frequency band).

In some embodiments, the method may further include determining a measure of reliability of the most recently determined value of the given reconstruction parameter. The method may yet further include deciding, based on the measure of reliability, whether to estimate the given reconstruction parameter of the lost frame based on the most recently determined value of the given reconstruction parameter or based on the most recently determined values of two or more reconstruction parameters (exceptionally, a single reconstruction parameter) other than the given reconstruction parameter.

In some embodiments, the method may further include, if the number of frames for which the value of the given reconstruction parameter could not be determined exceeds a third threshold, estimating the given reconstruction parameter of the lost frame based on the most recently determined values of the two or more reconstruction parameters (exceptionally, a single reconstruction parameter) other than the given reconstruction parameter. The method may further include otherwise estimating the given reconstruction parameter of the lost frame based on the most recently determined value of the given reconstruction parameter.

In some embodiments, each frame may contain reconstruction parameters relating to respective frequency bands. Then, a given reconstruction parameter of the lost frame may be estimated based on (one or more) reconstruction parameters relating to frequency bands different from a frequency band to which the given reconstruction parameter relates.

In some embodiments, the given reconstruction parameter may be estimated by interpolating between the reconstruction parameters relating to the frequency bands different from the frequency band to which the given reconstruction parameter relates.

In some embodiments, the given reconstruction parameter may be estimated by interpolating between reconstruction parameters relating to frequency bands neighboring the frequency band to which the given reconstruction parameter relates. Alternatively, if the frequency band to which the given reconstruction parameter relates has only one neighboring frequency band, the given reconstruction parameter may be estimated by extrapolating from the reconstruction parameter relating to that neighboring frequency band.

According to another aspect of the disclosure, a method of processing an audio signal is provided. The method may be performed at a receiver/decoder, for example. The audio signal may include a sequence of frames. Each frame may contain representations of a plurality of audio channels and reconstruction parameters for upmixing the plurality of audio channels to a predetermined channel format. Each reconstruction parameter may be explicitly coded once every given number of frames in the sequence of frames and differentially coded between frames for the remaining frames. The method may include receiving the audio signal. The method may further include generating a reconstructed audio signal in the predefined channel format based on the received audio signal. Therein, generating the reconstructed audio signal may include, for a given frame of the audio signal, identifying reconstruction parameters that are correctly decoded and reconstruction parameters that cannot be correctly decoded due to missing differential base. Said generating may further include, for the given frame, estimating the reconstruction parameters that cannot be correctly decoded based on correctly decoded reconstruction parameters of the given frame and/or correctly decoded reconstruction parameters of one or more earlier frames. Said generating may yet further include, for the given frame, using the correctly decoded reconstruction parameters and the estimated reconstruction parameters for generating the reconstructed audio signal of the given frame.

In some embodiments, estimating a given reconstruction parameter that cannot be correctly decoded for the given frame may involve estimating the given reconstruction parameter based on the most recent correctly decoded value of the given reconstruction parameter. Alternatively, said estimating may involve estimating the given reconstruction parameter based on the most recent correctly decoded values of two or more reconstruction parameters other than the given reconstruction parameter. Exceptionally, the given reconstruction parameter of the lost frame may be estimated based on the most recently determined value of one reconstruction parameter other than the given reconstruction parameter (e.g., for a reconstruction parameter relating to a frequency band that only has one neighboring frequency band).

In some embodiments, the method may further include determining a measure of reliability of the most recent correctly decoded value of the given reconstruction parameter. The method may further include deciding, based on the measure of reliability, whether to estimate the given reconstruction parameter based on the most recent correctly decoded value of the given reconstruction parameter or based on the most recent correctly decoded values of two or more reconstruction parameters (exceptionally, a single reconstruction parameter) other than the given reconstruction parameter.

In some embodiments, the method may further include, if the most recent correctly decoded value of the given reconstruction parameter is older than a predetermined threshold in units of frames, estimating the given reconstruction parameter based on the most recent correctly decoded values of the two or more reconstruction parameters (exceptionally, a single reconstruction parameter) other than the given reconstruction parameter. The method may further include otherwise estimating the given reconstruction parameter based on the most recent correctly decoded value of the given reconstruction parameter.

In some embodiments, each frame may contain reconstruction parameters relating to respective frequency bands. Then, a given reconstruction parameter that cannot be correctly decoded for the given frame may be estimated based on the most recent correctly decoded values of one or more reconstruction parameters relating to frequency bands different from a frequency band to which the given reconstruction parameter relates.

In some embodiments, the given reconstruction parameter may be estimated by interpolating between the reconstruction parameters relating to the frequency bands different from the frequency band to which the given reconstruction parameter relates.

In some embodiments, the given reconstruction parameter may be estimated by interpolating between reconstruction parameters relating to frequency bands neighboring the frequency band to which the given reconstruction parameter relates. Alternatively, if the frequency band to which the given reconstruction parameter relates has only one neighboring frequency band, the given reconstruction parameter may be estimated by extrapolating from the reconstruction parameter relating to that neighboring frequency band.

According to another aspect of the disclosure, a method of encoding an audio signal is provided. The method may be performed at an encoder, for example. The encoded audio signal may include a sequence of frames. Each frame may contain representations of a plurality of audio channels and reconstruction parameters for upmixing the plurality of audio channels to a predetermined channel format. The method may include, for each reconstruction parameter, explicitly encoding the reconstruction parameter once every given number of frames in the sequence of frames. The method may further include (time-)differentially encoding the reconstruction parameter between frames for the remaining frames. Therein, each frame may contain at least one reconstruction parameter that is explicitly encoded and at least one reconstruction parameter that is differentially encoded with reference to an earlier frame. The sets of explicitly encoded and differentially encoded reconstruction parameters may differ from one frame to the next. Further, the contents of these sets may repeat after a predetermined frame period.

According to another aspect, a computer program is provided. The computer program may include instructions that, when executed by a processor, cause the processor to carry out all steps of the methods described throughout the disclosure.

According to another aspect, a computer-readable storage medium is provided. The computer-readable storage medium may store the aforementioned computer program.

According to yet another aspect an apparatus including a processor and a memory coupled to the processor is provided. The processor may be adapted to carry out all steps of the methods described throughout the disclosure. This apparatus may relate to a receiver/decoder (decoder apparatus) or an encoder (encoder apparatus).

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) (and, e.g., their steps) are understood to likewise apply to the corresponding apparatus (and, e.g., their blocks, stages, units), and vice versa.

BRIEF DESCRIPTION OF DRAWINGS

Example embodiments of the disclosure are explained below with reference to the accompanying drawings, wherein FIG. 5 illustrates an example of a mobile device architecture for implementing the features and processes described in FIG. 1 to FIG. 4, FIG. 6 to FIG. 9 are flowcharts illustrating additional examples of methods of processing (e.g., decoding) audio signals according to embodiments of the disclosure.

DETAILED DESCRIPTION

Figure 1:
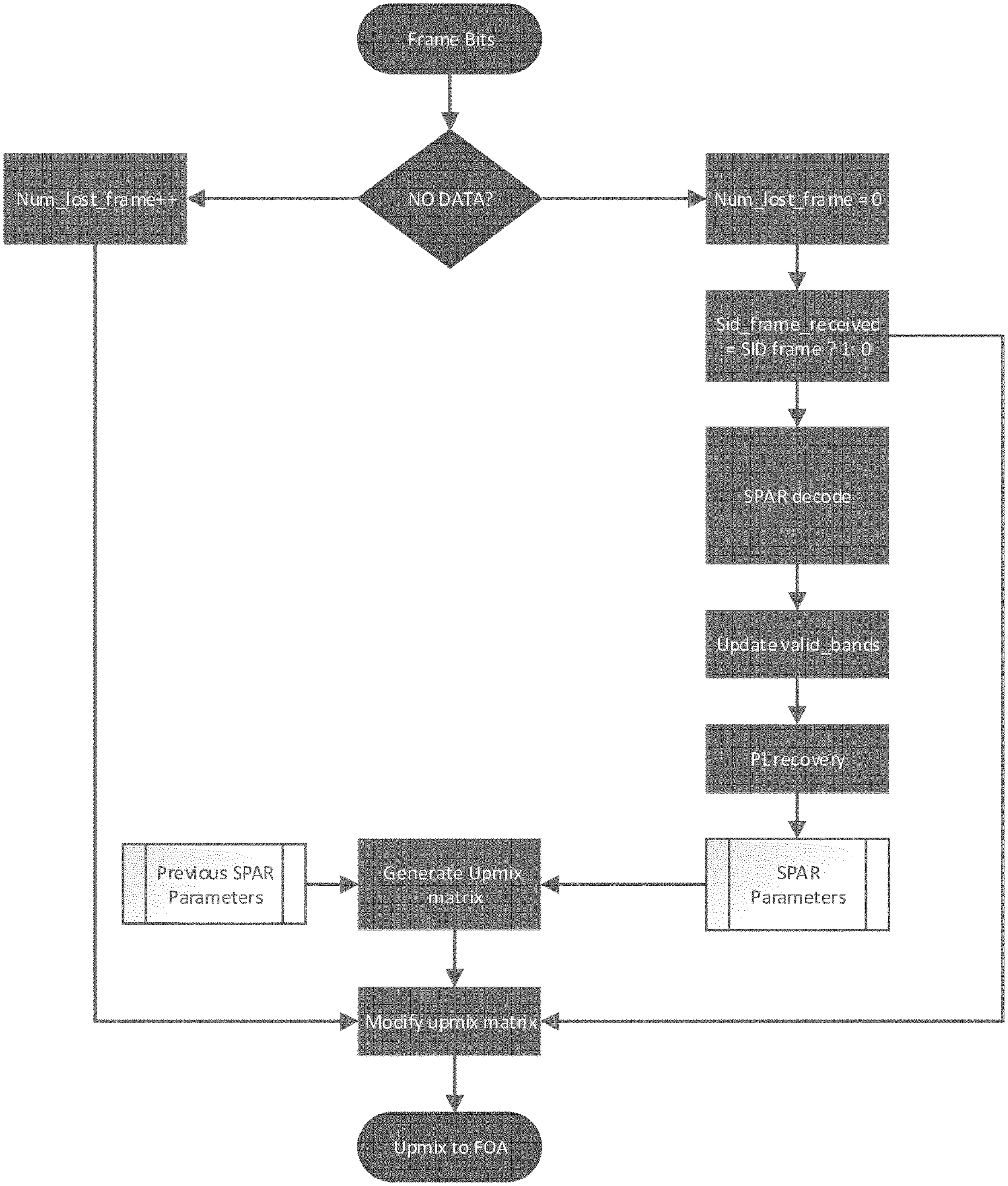
FIG. 1 is a flowchart illustrating an example flow in case of packet loss and good frames according to embodiments of the disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Broadly speaking, the technology according to the present disclosure may comprise:

1. Holding of reconstruction parameters (e.g., SPAR parameters) during packet losses from the last good frame,
2. Muting and spatial image manipulation after long durations of packet losses to mitigate inconsistent concealment signals (e.g., EVS concealment signals), and
3. reconstruction parameter estimation after packet loss in case of time-differential coding.

IVAS System

First, possible implementations of the IVAS system, as a non-limiting example of a system to which techniques of the present disclosure are applicable, will be described.

IVAS provides a spatial audio experience for communication and entertainment applications. The underlying spatial audio format is First Order Ambisonics (FOA). For example, 4 signals (W, Y, Z, X) are coded which allow rendering to any desired output format like immersive speaker playback or binaural reproduction over headphones. Dependent on total bitrate, 1, 2, 3, or 4 audio signals (downmix channels) are transmitted over EVS (Enhanced Voice Service) codecs running in parallel at low latency. At the decoder the 4 FOA signals are reconstructed by processing the downmix channels and decorrelated versions thereof using transmitted Parameters. This process is also referred to here as upmix and the parameters are called Spatial Reconstruction (SPAR) parameters. The IVAS decoding process consists of EVS (core) decoding and SPAR upmixing. The EVS decoded signals are transformed by a complex-valued low latency filter bank. SPAR parameters are encoded per perceptually motivated frequency bands and the number of bands is typically 12. The encoded downmix channels are, except for the W channel, residual signals after (cross-channel) prediction using the SPAR parameters. The W channel is transmitted unmodified or modified (active W) such that better prediction of the remaining channels is possible. After SPAR upmixing in the frequency domain, FOA time domain signals are generated by filter bank synthesis. One audio frame typically has the duration of 20 ms.

In summary, the IVAS decoding process consists of EVS core decoding of downmix channels, filter bank analysis, parametric reconstruction of the 4 FOA signals (upmix) and filter bank synthesis.

Especially at low bitrates like 32 kb/s or 64 kb/s SPAR parameters may be time-differentially coded, e.g. depend on the previously decoded frames for SPAR bitrate reduction.

In general, techniques (e.g., methods and apparatus) according to embodiments of the present disclosure may be applicable to frame-based (or packet based) multi-channel audio signals, i.e., (encoded) audio signals comprising a sequence of frames (or packets). Each frame contains representations of a plurality of audio channels and reconstruction parameters (e.g., SPAR parameters) for upmixing the plurality of audio channels to a predetermined channel format, such as FOA with W, X, Y, and Z audio channels (components). The plurality of audio channels of the (encoded) audio signal may relate to downmix channels obtained by downmixing audio channels of the predefined channel format, e.g., W, X, Y, and Z.

IVAS System Constraints

EVS- and SPAR-DTX

If no voice activity is detected (VAD) and background levels are low the EVS encoder may switch to the Discontinuous Transmission (DTX) mode which runs at very low bitrate. Typically, every $8^{th}$ frame a small number of DTX parameters (Silence Indicator frame, SID) is transmitted which control comfort noise generation (CNG) at the decoder. Likewise, dedicated SPAR parameters are transmitted for SID frames which allow faithful spatial reconstruction of the original spatial ambience characteristics. A SID frame is followed by 7 frames without any data (NO_DATA) and the SPAR parameters are held constant until the next SID frame or an ACTIVE audio frame is received.

EVS-PLC

If the EVS decoder detects a lost frame a concealment signal is generated. The generation of the concealment signal may be guided by signal classification parameters sent by the encoder in a previous good frame without concealment and uses various techniques dependent on the codec mode (MDCT based transform codec or predictive voice codec), and other parameters. EVS concealment may result in infinite comfort noise generation. Since for IVAS multiple instances of EVS (one for each downmix channel) run in parallel in different configurations, EVS concealment may be inconsistent across downmix channels and for different content.

It is to be noted that EVS-PLC does not apply to metadata, such as the SPAR parameters.

Time-Differential Coding of Reconstruction Parameters

Techniques according to embodiments of the present disclosure are applicable to codecs employing time-differential coding of metadata, including reconstruction parameters (e.g., PSAR parameters). Unless indicated otherwise, differential coding in the context of the present disclosure shall mean time-differential coding.

For example, each reconstruction parameter may be explicitly (i.e., non-differentially) coded once every given number of frames in the sequence of frames and differentially coded between frames for the remaining frames. Therein, the time-differential coding may follow an (interleaved) differential coding scheme according to which each frame contains at least one reconstruction parameter that is explicitly coded and at least one reconstruction parameter that is differentially coded with reference to an earlier frame. The sets of explicitly coded and differentially coded reconstruction parameters may differ from one frame to the next. The contents of these sets may repeat after a predetermined frame period. For instance, the contents of the aforementioned sets may be given by a group of (interleaved) coding schemes that may be cycled through in sequence. Non-limiting examples of such coding schemes that are applicable for example in the context of IVAS are given below.

For efficient encoding of SPAR parameters time-differential coding may be applied for example according to the following scheme:

TABLE 1

SPAR coding schemes with time-differentially coded bands indicated as 1

| Coding Scheme | Time Diff Coding, Bands 1-12 |
|---|---|
| base | 0 0 0 0 0 0 0 0 0 0 0 0 |
| 4a | 0 1 1 1 0 1 1 1 0 1 1 1 |
| 4b | 1 0 1 1 1 0 1 1 1 0 1 1 |
| 4c | 1 1 0 1 1 1 0 1 1 1 0 1 |
| 4d | 1 1 1 0 1 1 1 0 1 1 1 0 |

TABLE 2

Order of application of Time-differentially SPAR coding schemes

| previous frame's coding scheme | current frame's time differential coding scheme |
|---|---|
| Base | 4a |
| 4a | 4b |
| 4b | 4c |
| 4c | 4d |
| 4d | 4a |

Here, time-differential coding always cycles through 4a, 4b, 4c, 4d and back to restart at 4a again. Dependent on the payload of the base scheme and the total bitrate requirement time-differential coding may be applied or not.

This coding method ensures that, after packet loss, parameters for 3 bands (for 12 parameter bands configuration, other schemes may apply to other parameter band configurations in a similar fashion) always can be correctly decoded as opposed to time-differential coding for all bands. Varying the coding scheme as shown in Table 2 makes sure that parameters of all bands can be correctly decoded within 4 consecutive (not lost) frames. However, depending on the packet loss pattern, parameters for some bands may not be decoded correctly beyond 4 frames.

Example Techniques

Prerequisites

1. A logic in the decoder which keeps track of frame type (e.g., NO_DATA, SID and ACTIVE frames) such that DTX and lost/bad frames can be handled differently.
2. A logic in the decoder to keep track of the consecutive number of lost packets.
3. A logic to keep track of time-differentially coded reconstruction parameter (e.g., SPAR parameter) bands after packet loss (e.g. without a base for the coded difference) and the number of frames since the last base.

An example of the above logic is illustrated in pseudo code below for decoding one frame with SPAR parameters covering 12 frequency bands.

Listing 1. Logic around packet losses to control the IVAS decoding process

```
if frameType ~= NO_DATA_FRAME /*good frame*/
        /*Data received. Reset lost-frame counter which will be used for controlling
        spatial fading and muting for PLC*/
        num_lost_frames = 0;
        /* here we keep track if we are in DTX mode (SID frame) or usual voice/audio
mode
        Which allows us to adapt processing in case of packet loss*/
        if frame_type == SID_FRAME
           sid_frame_received = 1; /*DTX mode*/
        elseif frame_type == ACTIVE_FRAME
           sid_frame_received = 0; /*voice/audio mode*/
        end
        /*Parse bitstream and decode parameters*/
        [SPAR_parameters, coding_scheme] = decode_SPAR_parameters (frame_bits);
        /* Parameters are coded according to one of the schemes in Table 1. Based on the
        current coding scheme some or all bands may be absolutely coded
        (e.g. not depending on previous data) and other bands may be time-differentially
coded.
        If time differentially coded, the basis for time-differential decoding may got lost
with
        a previously lost packet. We may label parameter bands where this happens as
invalid
        and keep track of the situation with the valid_bands array. */
        if coding_scheme=="base"
           /*all bands correctly decoded, regardless of previous lost packets*/
           valid_bands = [1,1,1,1,1,1,1,1,1,1,1,1]
        elseif coding_scheme=="4a"
           valid_bands = [1,0,0,0,1,0,0,0,1,0,0,0] | valid_bands /* | means logical OR */
        elseif coding_scheme=="4b"
           valid_bands = [0,1,0,0,0,1,0,0,0,1,0,0] | valid_bands
        elseif coding_scheme=="4c"
           valid_bands = [0,0,1,0,0,0,1,0,0,0,1,0] | valid_bands
        elseif coding_scheme=="4d"
           valid_bands = [0,0,0,1,0,0,0,1,0,0,0,1] | valid_bands
        end
        /* for an educated decision on how to best replace invalid parameters
        we are interested in how old previously correctly decoded parameters for
        particular bands are. We keep track of this with num_frames_since_base array. */
        num_frames_since_base(valid_bands) = 0 /*correctly decoded bands */
        num_frames_since_base(~valid_bands) =
num_frames_since_base(~valid_bands)+1
        /*Now fill any invalid band parameters based on previous
        correctly decoded parameters or current correctly decoded parameters in closest
        frequency bands. */
        for band = invalid /*all invalid bands*/
            framesThreshold = 3; /* as an example */
            if num_frames_since_base(band)>framesThreshold
              SPAR_parameters(band) = interpolateFromCurrentData(SPAR_parameters);
           else
              SPAR_parameters(band) = SPAR_parameters_previous(band);
      end
      /*Note: Interpolation may be based on only current valid bands or on current valid
    bands and selected data from previous frames. */
      SPAR_parameters_previous = SPAR_parameters
  else /*bad frame, lost frame or no data frame in DTX mode*/
        num_lost_frames = num_lost_frames+1;
        valid_bands = [0,0,0,0,0,0,0,0,0,0,0,0] /* no parameter can be decoded */
        num_frames_since_base(:) = num_frames_since_base(:)+1 /*keep track when
        the last parameter was decoded correctly*/
        SPAR_parameters = SPAR_parameters_previous
End
```

Proposed Processing

In general, it is understood that methods according to embodiments of the disclosure are applicable to (encoded) audio signals that comprise a sequence of frames (packets), each frame containing representations of a plurality of audio channels and reconstruction parameters for upmixing the plurality of audio channels to a predetermined channel format. Typically, such methods comprise receiving the audio signal and generating a reconstructed audio signal in the predefined channel format based on the received audio signal.

Examples of processing steps in the context of IVAS that may be used in generating the reconstructed audio signal will be described next. It is however understood that these processing steps are not limited to IVAS and generally applicable to PLC of reconstruction parameters for frame-based (packet-based) audio codecs.

1. Muting: If the number of consecutive lost frames exceeds a threshold (second threshold in the claims, for example 8), then decoded output (e.g., FOA output) is (gradually) muted, for example by 3 dB per (lost) frame. Otherwise, no muting is applied. Muting can be accomplished by modifying the upmix matrix (e.g., SPAR upmix matrix) accordingly. Muting makes PLC more consistent across bitrates and content for long durations of packet loss. Due to the above logic, there is means to apply muting also in case of CNG with DTX if desired.

In general, if the number of consecutively lost frames exceeds a threshold (second threshold in the claims), the reconstructed audio signal may be gradually faded out (muted). Gradually fading out (muting) the reconstructed audio signal may be achieved by applying a gradually decaying gain to the reconstructed audio signal, by applying a gradually decaying gain to the plurality of audio channels of the audio signal, or by applying a gradually decaying gain to any upmix coefficients used in generating the reconstructed audio signal. The gradual fading out may be performed in accordance with a predetermined fade-out time (time constant). For example, as noted above, the reconstructed audio signal may be muted by 3 dB per (lost) frame. The second threshold may be eight frames, for example.

2. Spatial fade-out: If the number of consecutive lost frames exceeds a threshold (first threshold in the claims, for example 4 or 8), then decoded output (e.g., FOA output) is spatially faded towards a spatial target (i.e., to a predefined spatial configuration) within a pre-defined number of frames. Otherwise, no spatial fading is applied. Spatial fading can be accomplished by linearly interpolating between the unity matrix (e.g., 4×4) and the spatial target matrix according to the envisioned fade-out time. As example, a direction independent spatial image (e.g., muting all channels except W) can reduce spatial discontinuities after packet loss (if not fully muted). That is, for FOA the predefined spatial configuration may only include the W audio channel. Alternatively, the predefined spatial configuration may relate to a predefined direction. For example, another useful spatial target for FOA is the frontal image (X=W sqrt(2), Y=Z=0). That is, one of the X, Y, Z components (e.g., X) may be faded to a scaled version of W and the other two of the X, Y, Z components (e.g., Y and Z) may be faded to zero. In any case, the resulting matrix is then applied to the SPAR upmix matrix for all bands. Accordingly, the (SPAR) upmix matrix for audio reconstruction may be determined (e.g., generated) based on a matrix product of a salient upmix matrix and the interpolated matrix, where the salient upmix matrix is derivable from the reconstruction parameters. Spatial fade-out makes PLC more consistent across bitrates and content for long durations of packet loss. Due to the above logic there is means to apply spatial fading also in case of CNG with DTX if desired. The FOA format is used as a non-limiting example. Other formats, e.g., channel based spatial formats including stereo, can be used as well. It is understood that a particular format may use a particular corresponding spatial fade matrix.

In general, generating the reconstructed audio signal may comprise, if a number of consecutively lost frames exceeds a threshold (first threshold in the claims), fading the reconstructed audio signal to a predefined spatial configuration. In accordance with the above, this predefined spatial configuration may correspond to a spatially uniform audio signal or to a predefined direction (e.g., a predefined direction to which the reconstructed audio signal is rendered). It is understood that the (first) threshold for spatial fading may be smaller or equal than the (second) threshold for fading out (muting). Accordingly, if the above processing steps are combined, the reconstructed audio signal may be first faded to the predefined spatial configuration, followed by, or in conjunction with, muting.

3. Estimation of parameters/recovery from packet loss with time-differential coding: Due to the above logic, parameter bands can be identified which are not yet correctly decoded since the time-difference base is missing. Those parameter bands can be allocated by previous frame data just like in the case of packet loss concealment. As alternative strategy, linear (or nearest neighbor) interpolation across frequency bands is proposed in the case when the last received base (or in general the last correctly decoded parameter of a specific parameter is deemed too old. For frequency bands at the boundaries of the covered frequency range, this may amount to extrapolation from their respective neighboring (or nearest) frequency bands. The proposed approach is beneficial since interpolation over correctly decoded bands likely gives better parameter estimates than using old previous frame data in conjunction with new correctly decoded data.

Notably, the proposed approach may be used both in case of PLC for few lost packets (e.g., before spatial fade-out and/or muting, or during spatial fade-out and/or muting, until the reconstructed audio signal has been fully spatially faded or fully faded out), and in case of recovery after burst packet loss.

In general, when at least one frame of the audio signal has been lost, estimations of the reconstruction parameters of the at least one lost frame may be estimated based on the reconstruction parameters of an earlier frame. These estimation can then be used for generating the reconstructed audio signal of the at least one lost frame.

For example, a given reconstruction parameter of a lost frame can be extrapolated across time, or interpolated/extrapolated across frequency (in general, interpolated/extrapolated across other reconstruction parameters). In the former case, the given reconstruction parameter of the lost frame may be estimated based on the most recently determined value of the given reconstruction parameter. In the latter case, the given reconstruction parameter of the lost frame may be estimated based on the most recently determined values of one (in case of a frequency band at the boundary of the covered frequency range), two, or more reconstruction parameters other than the given reconstruction parameter.

Whether to use extrapolation across time or interpolation/extrapolation across other reconstruction parameters may be decided based on a measure of reliability of the most recently determined value of the given reconstruction parameter. That is, it may be decided, based on the measure of reliability, whether to estimate the given reconstruction parameter of the lost frame based on the most recently determined value of the given reconstruction parameter or based on the most recently determined values of two or more reconstruction parameters other than the given reconstruction parameter. This measure of reliability may be determined based on an age (e.g., in units of frames) of the most recently determined value of the given reconstruction parameter and/or the age (e.g., in units of frames) of the most recently determined value(s) of the reconstruction parameter(s) other than the given reconstruction parameter. In one implementation, if the number of frames for which the value of the given reconstruction parameter could not be determined exceeds a third threshold, the given reconstruction parameter of the lost frame may be estimated based on the most recently determined values of the one, two, or more reconstruction parameters other than the given reconstruction parameter. Otherwise, the given reconstruction parameter of the lost frame may be estimated based on the most recently determined value of the given reconstruction parameter.

As noted above, each frame may contain reconstruction parameters relating to respective frequency bands, and a given reconstruction parameter of the lost frame may be estimated based on one or more reconstruction parameters relating to frequency bands different from a frequency band to which the given reconstruction parameter relates. For example, the given reconstruction parameter may be estimated by interpolating between (or extrapolating from) the one or more reconstruction parameters relating to the frequency bands different from the frequency band to which the given reconstruction parameter relates. More specifically, in some implementations the given reconstruction parameter may be estimated by interpolating between reconstruction parameters relating to frequency bands neighboring the frequency band to which the given reconstruction parameter relates, or, if the frequency band to which the given reconstruction parameter relates has only one neighboring (or nearest) frequency band (which is the case for the highest and lowest frequency bands), by extrapolating from the reconstruction parameter relating to that neighboring (or nearest) frequency band.

It is understood that the above processing steps may be used, in general, either alone or in combination. That is, methods according to the present disclosure may involve any one, any two, or all of the aforementioned processing steps 1 to 3.

Summary of Important Aspects of the Present Disclosure

The present disclosure proposes the concept of a spatial target for PLC and spatial fade out, potentially in conjunction with muting.

The present disclosure proposes the concept of having frames with a mixture of concealment and regular decoding during the time-differential coding recovery phase. This may involve

- Determining Parameters after packet loss in case of time-differential coding based on previous good frame data and/or interpolation of current, correctly decoded parameters, and
- Decide between previous good frame data and/or current interpolated data based on a measure how recent the previous good frame data is.

Example Process and System

FIG. 1 is a flowchart illustrating an example flow in case of packet loss (left path) and good frames (right path). The flow chart until entering the "Generate Upmix matrix" box is detailed out in the form of pseudo-code in Listing 1 and described in above section Proposed Processing, item 3. The processing in "Modify upmix matrix" is described in above section Proposed Processing, items 1. and 2.

Figure 2:
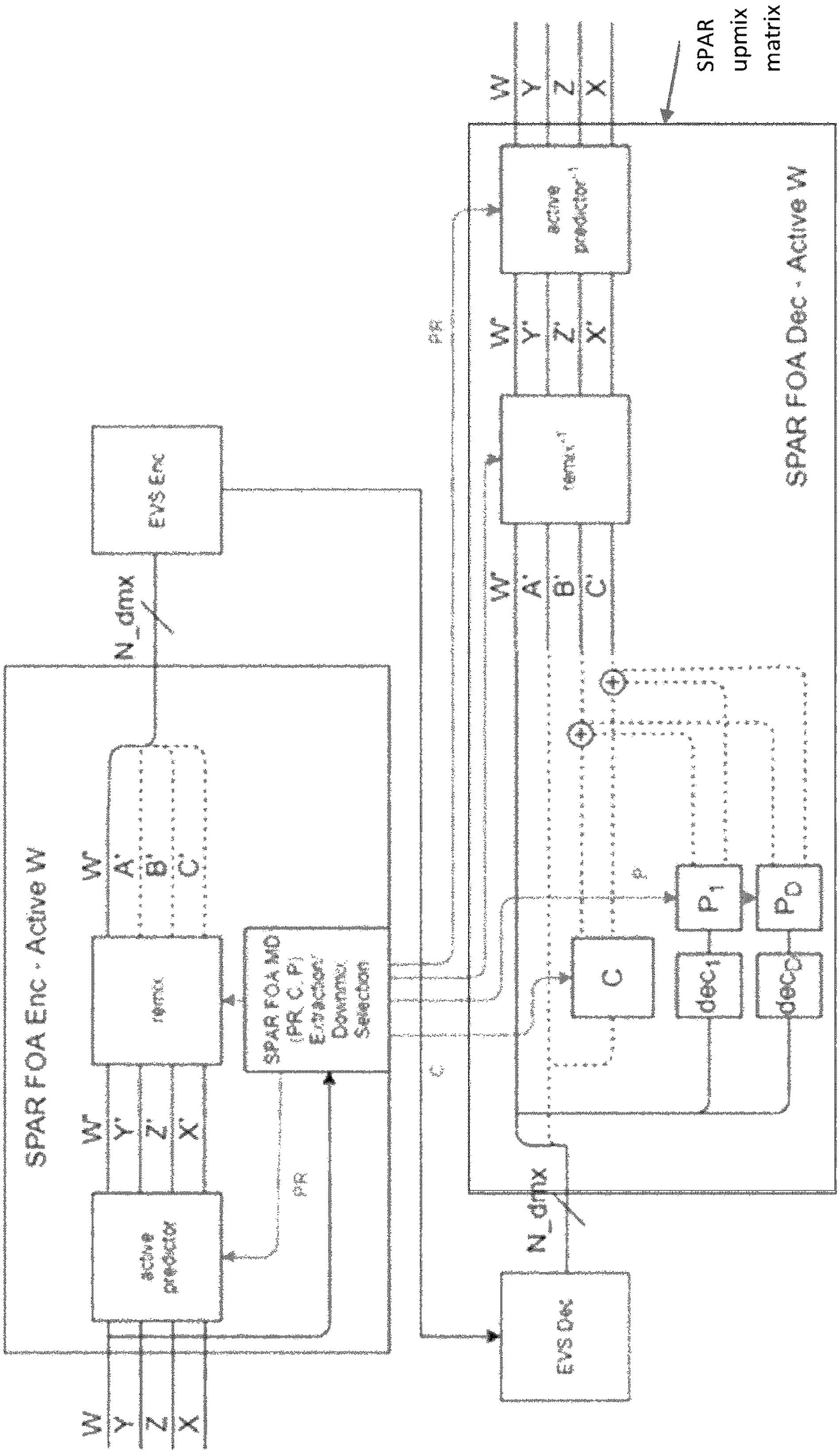
FIG. 2 is a block diagram illustrating example encoders and decoders according to embodiments of the disclosure.

FIG. 2 is a block diagram illustrating example IVAS SPAR encoder and decoder. The IVAS upmix matrix comprises processing of decoded downmix channels and decorrelated versions with Parameters C, P1, . . . , PD), the inverse remix matrix as well as the inverse prediction all into one upmix matrix. The upmix matrix may be modified by PLC processing.

Figure 3:
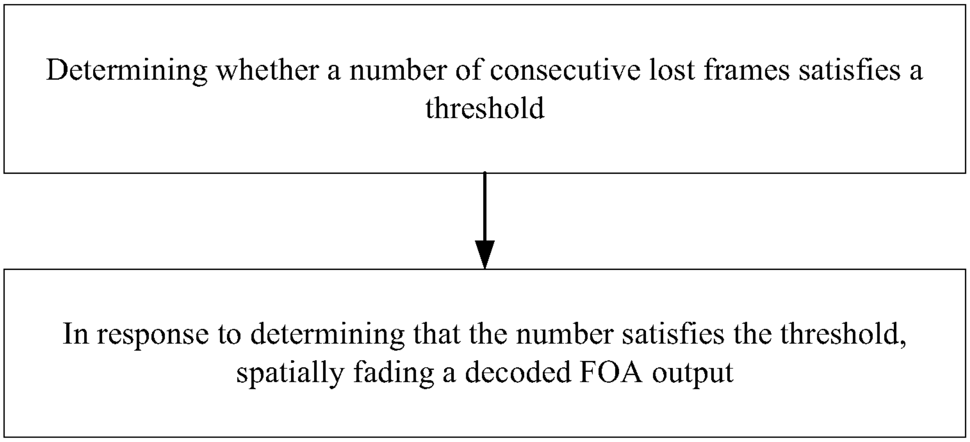
FIG. 3 and FIG. 4 are flowcharts illustrating example processes of PLC according to embodiments of the disclosure.
Figure 4:
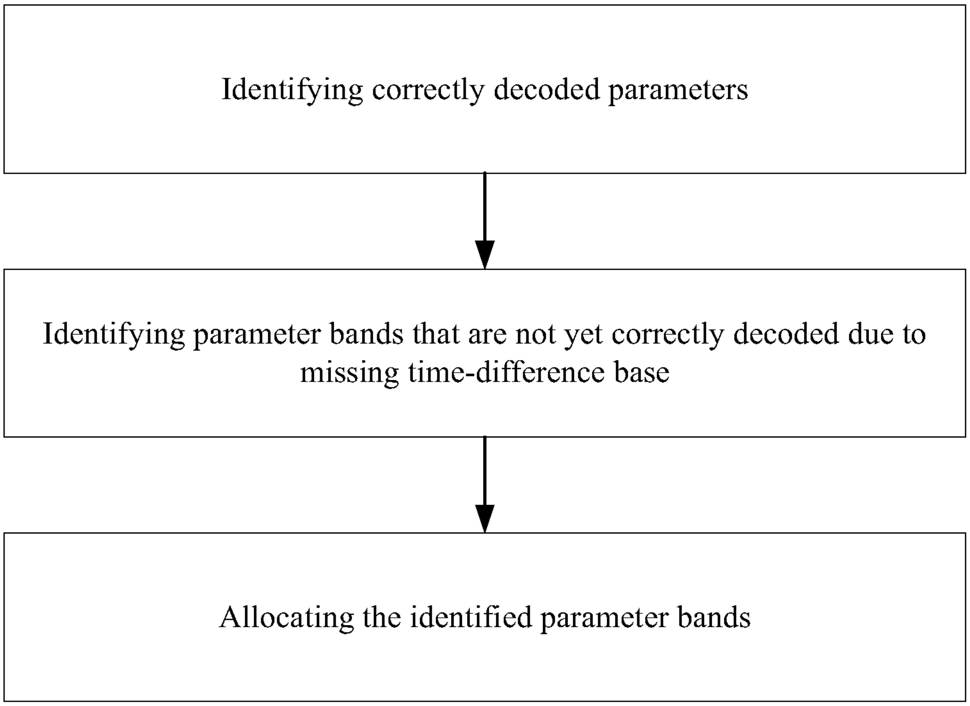

FIG. 3 and FIG. 4 are flowcharts illustrating example processes of PLC.

Example System Architecture

FIG. 5 is a mobile device architecture for implementing the features and processes described in reference to FIGS. 1-4, according to an embodiment. Architecture 500 can be implemented in any electronic device, including but not limited to: a desktop computer, consumer audio/visual (AV) equipment, radio broadcast equipment, mobile devices (e.g., smartphone, tablet computer, laptop computer, wearable device). In the example embodiment shown, architecture 500 is for a smart phone and includes processors) 801, peripherals interface 802, audio subsystem 803, loudspeakers 804, microphone 805, sensors 806 (e.g., accelerometers, gyros, barometer, magnetometer, camera), location processor 807 (e.g., GNSS receiver), wireless communications subsystems 808 (e.g., Wi-Fi, Bluetooth, cellular) and I/O subsystems) 809, which includes touch controller 810 and other input controllers 811, touch surface 812 and other input/control devices 813. Other architectures with more or fewer components can also be used to implement the disclosed embodiments.

Memory interface 814 is coupled to processors 801, peripherals interface 802 and memory 815 (e.g., flash, RAM, ROM). Memory 815 stores computer program instructions and data, including but not limited to: operating system instructions 816, communication instructions 817, GUI instructions 818, sensor processing instructions 819, phone instructions 820, electronic messaging instructions 821, web browsing instructions 822, audio processing instructions 823, GNSS/navigation instructions 824 and applications/data 825. Audio processing instructions 823 include instructions for performing the audio processing described in reference to FIGS. 1-2.

Techniques of Audio Processing and PLC for Reconstruction Parameters

Examples of PLC in the context of IVAS have been described above. It is understood that the concepts provided in that context are generally applicable to PLC of reconstruction parameters for frame-based (packet-based) audio signals. Additional examples of methods employing these concepts will now be described with reference to FIGS. 6-10.

Figure 6:
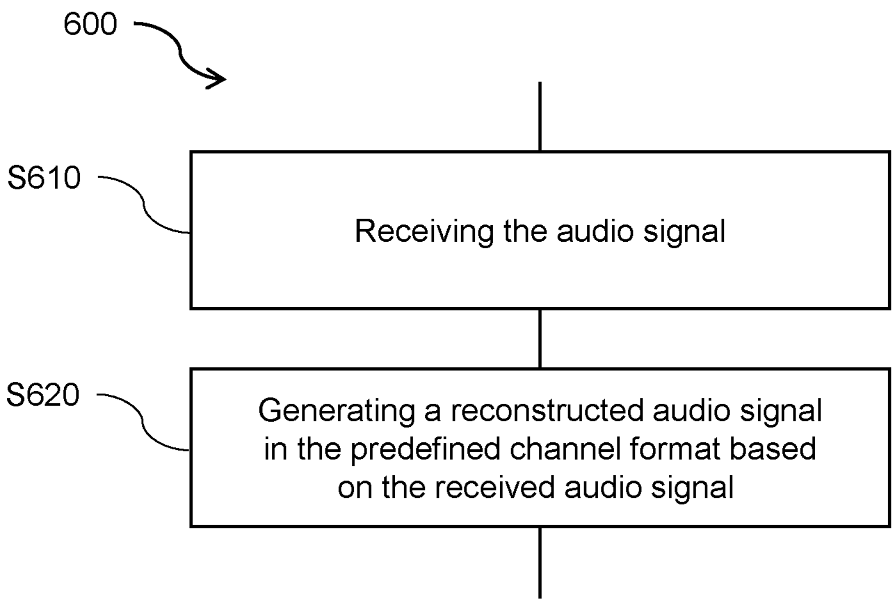

An outline of an overall method 600 of processing an audio signal is given in FIG. 6. As noted above, the (encoded) audio signal comprises a sequence of frames, each frame containing representations of a plurality of audio channels and reconstruction parameters for upmixing the plurality of audio channels to a predetermined channel format. Method 600 comprises steps S610 and S620 that may comprise further sub-steps and that will be detailed below with reference to FIGS. 7-9. Further, method 600 may be performed at a receiver/decoder, for example.

At step S610, the (encoded) audio signal is received. The audio signal may be received as a (packetized) bitstream, for example.

At step S620, a reconstructed audio signal in the predefined channel format is generated based on the received audio signal. Therein, the reconstructed audio signal may be generated based on the received audio signal and the reconstruction parameters (and/or estimations of the reconstruction parameters, as detailed below). Further, generating the reconstructed audio signal may involve upmixing the audio channels of the audio signal to the predefined channel format. Upmixing of the audio channels to the predefined channel format may relate to reconstruction of audio channels of the predefined channel format based on the audio channels of the audio signal and decorrelated versions thereof. The decorrelated versions may be generated based on (at least some of) the audio channels of the audio signal and the reconstruction parameters.

Figure 7:
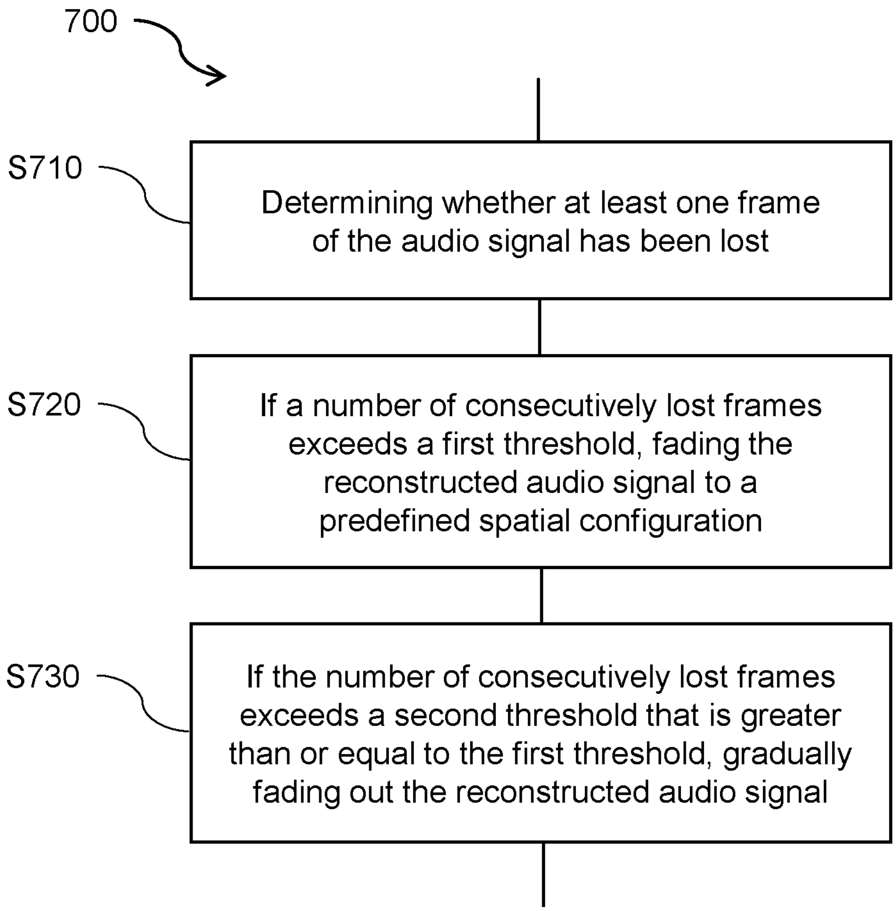

FIG. 7 illustrates a method 700 containing example (sub-) steps S710, S720, and S730 of generating the reconstructed audio signal at step S620. It is understood that steps S720 and S730 relate to possible implementations of step S620 that may be used either alone or in combination. That is, step S620 may include (in addition to step S710) none, any, or both of steps S720 and S730.

At step S710, it is determined whether at least one frame of the audio signal has been lost. This may be done in line with the above description in section Prerequisites.

If so, at step S720, if further a number of consecutively lost frames exceeds a first threshold, the reconstructed audio signal is faded to a predefined spatial configuration. This may be done in accordance with above section Proposed Processing, item/step 2.

Additionally or alternatively, at step S730, if the number of consecutively lost frames exceeds a second threshold that is greater than or equal to the first threshold, the reconstructed audio signal is gradually faded out (muted). This may be done in accordance with above section Proposed Processing, item/step 1.

Figure 8:
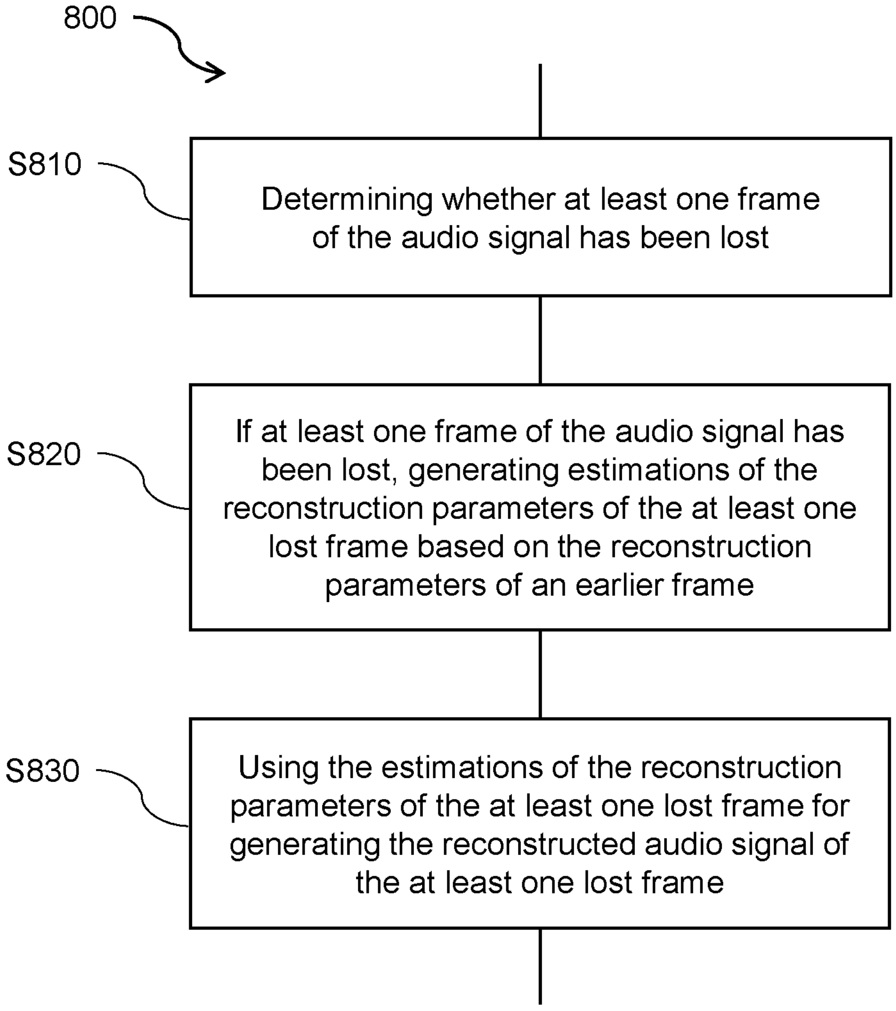

FIG. 8 illustrates a method 800 containing example (sub-) steps S810, S820, and S830 of generating the reconstructed audio signal at step S620. It is understood that steps S810 to S830 relate to a possible implementation of step S620 that may be used either alone or in combination with the possible implementation(s) of FIG. 7.

At step S810, it is determined whether at least one frame of the audio signal has been lost. This may be done in line with the above description in section Prerequisites.

Then, at step S820, if at least one frame of the audio signal has been lost, estimations of the reconstruction parameters of the at least one lost frame are generated based on one or more reconstruction parameters of an earlier frame. This may be done in accordance with above section Proposed Processing, item/step 3.

At step S830, the estimations of the reconstruction parameters of the at least one lost frame are used for generating the reconstructed audio signal of the at least one lost frame. This may be done as discussed above for step S620, for example via upmixing. It is understood that if the actual audio channels have been lost as well, estimates thereof may be used instead. EVS concealment signals are examples of such estimates.

Method 800 may be applied as long as fewer than a predetermined number of frames (e.g., fewer than the first threshold or second threshold) have been lost. Alternatively, method 800 may be applied until the reconstructed audio signal has been fully spatially faded and/or fully faded out. As such, in case of persistent packet loss, method 800 may be used for mitigating packet loss before muting/spatial fading takes effect, or until muting/spatial fading is complete. It is however to be noted that the concept of method 800 can also be used for recovery from burst packet losses in the presence of time-differential coding of reconstruction parameters.

Figure 9:
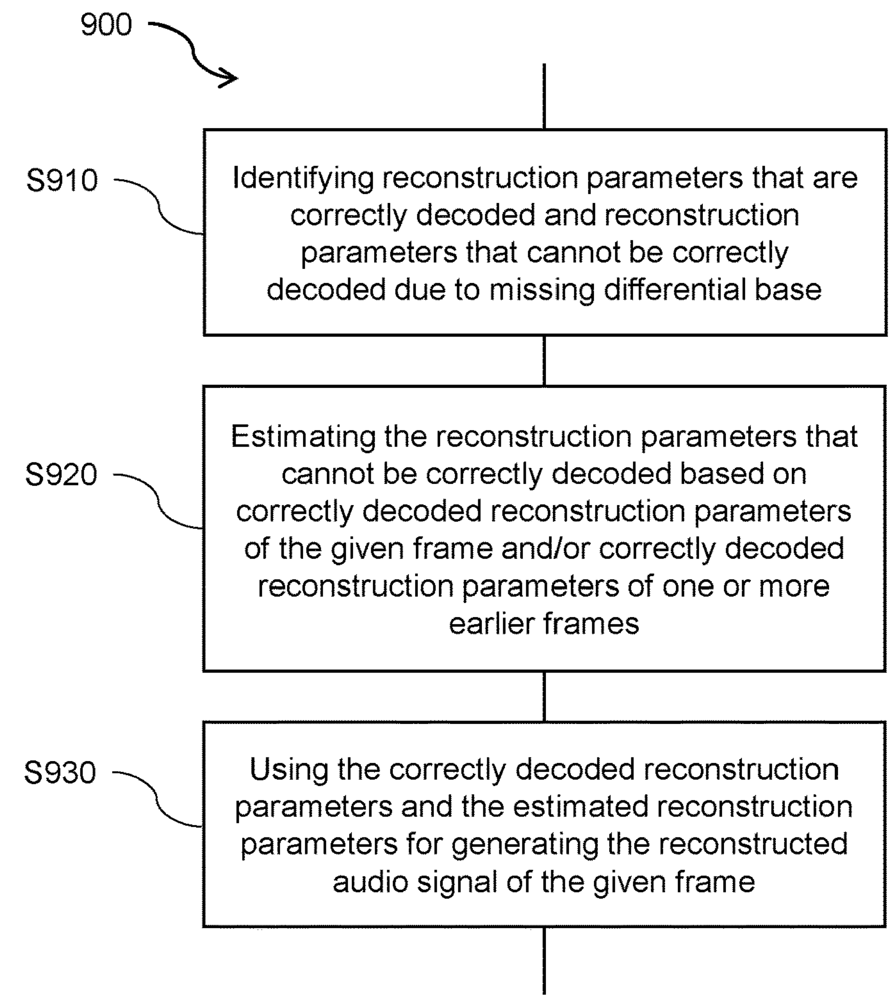

An example of such method of processing an audio signal for recovery from burst packet loss, as may be performed at a receiver/decoder for example, will now be described with reference to FIG. 9. As before, it is assumed that the audio signal comprises a sequence of frames, each frame containing representations of a plurality of audio channels and reconstruction parameters for upmixing the plurality of audio channels to a predetermined channel format. Further, it is assumed that each reconstruction parameter is explicitly coded once every given number of frames in the sequence of frames and differentially coded between frames for the remaining frames. This may be done in accordance with above section Time-Differential Coding of Reconstruction Parameters. In analogy to method 600, the method of processing an audio signal for recovery from burst packet loss comprises receiving the audio signal (in analogy to step S610) and generating a reconstructed audio signal in the predefined channel format based on the received audio signal (in analogy to step S620). Method 900 as illustrated in FIG. 9 comprises steps S910, S920, and S930 that are sub-steps of generating the reconstructed audio signal in the predefined channel format based on the received audio signal for a given frame. It is understood that the method for recovery from burst packet loss can be applied to correctly received frames (e.g., the first few frames) that follow a number of lost frames.

At step S910, reconstruction parameters that are correctly decoded and reconstruction parameters that cannot be correctly decoded due to missing differential base are identified. Missing time differential base is expected to result if a number of frames (packets) have been lost in the past.

At step S920, the reconstruction parameters that cannot be correctly decoded are estimated based on correctly decoded reconstruction parameters of the given frame and/or correctly decoded reconstruction parameters of one or more earlier frames. This may be done in accordance with above section Proposed Processing, item 3.

For example, estimating a given reconstruction parameter that cannot be correctly decoded for the given frame (due to missing time differential base) may involve either of estimating the given reconstruction parameter based on the most recent correctly decoded value of the given reconstruction parameter (e.g., the last correctly decoded value before (burst) packet loss), or estimating the given reconstruction parameter based on the most recent correctly decoded values of one or more reconstruction parameters other than the given reconstruction parameter. Notably, the most recent correctly decoded values of one or more reconstruction parameters other than the given reconstruction parameters may have been decoded for/from the (current) given frame. Which of the two approaches should be followed may be decided based on a measure of reliability of the most recent correctly decoded value of the given reconstruction parameter. This measure may be the age of the most recent correctly decoded value of the given reconstruction parameter, for example. For instance, if the most recent correctly decoded value of the given reconstruction parameter is older than a predetermined threshold (e.g., in units of frames), the given reconstruction parameter may be estimated based on the most recent correctly decoded values of the one or more reconstruction parameters other than the given reconstruction parameter. Otherwise, the given reconstruction parameter may be estimated based on the most recent correctly decoded value of the given reconstruction parameter. It is however understood that other measures of reliability are feasible as well.

Depending on the applicable codec (such as IVAS, for example), each frame may contain reconstruction parameters relating to respective ones among a plurality of frequency bands. Then, a given reconstruction parameter that cannot be correctly decoded for the given frame may be estimated based on the most recent correctly decoded values of one or more reconstruction parameters relating to frequency bands different from a frequency band to which the given reconstruction parameter relates. For example, the given reconstruction parameter may be estimated by interpolating between the reconstruction parameters relating to the frequency bands different from the frequency band to which the given reconstruction parameter relates. In some cases, the given reconstruction parameter may be extrapolated from a single reconstruction parameter relating to a frequency band different from the frequency band to which the given reconstruction parameter relates. Specifically, the given reconstruction parameter may be estimated by interpolating between reconstruction parameters relating to frequency bands neighboring the frequency band to which the given reconstruction parameter relates. If the frequency band to which the given reconstruction parameter relates has only one neighboring (or nearest) frequency band (which is the case, e.g., for the highest and lowest frequency bands), the given reconstruction parameter may be estimated by extrapolating from the reconstruction parameter relating to that neighboring (or nearest) frequency band.

At step S930, the correctly decoded reconstruction parameters and the estimated reconstruction parameters are used for generating the reconstructed audio signal of the given frame. This may be done as discussed above for step S620, for example via upmixing.

Figure 10:
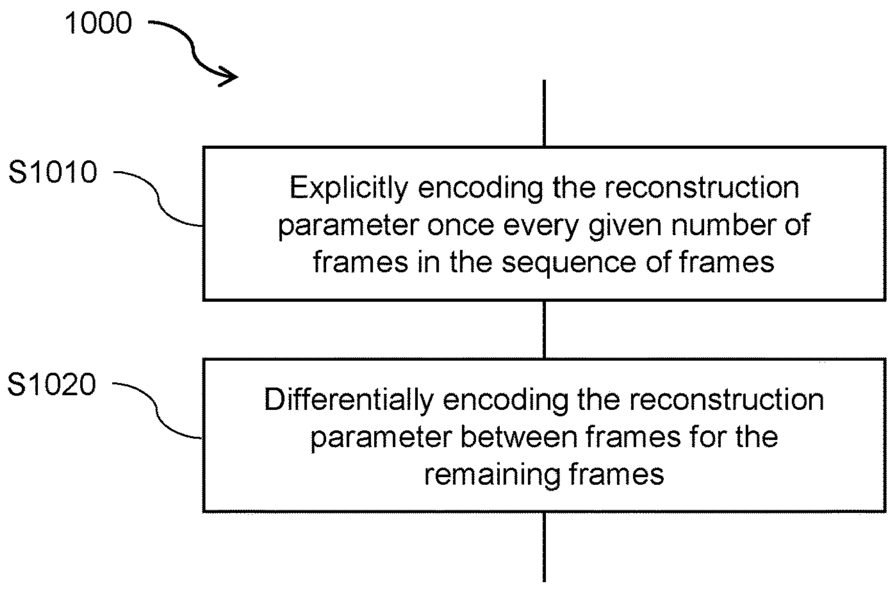
FIG. 10 is a flowchart illustrating an example of a method of encoding an audio signal according to embodiments of the disclosure.

A scheme for time-differential coding of reconstruction parameters has been described above in section Time-Differential Coding of Reconstruction Parameters. It is understood that the present disclosure also relates to methods of encoding audio signals that apply such time-differential coding. An example of such method 1000 of encoding an audio signal is schematically illustrated in FIG. 10. It is assumed that the encoded audio signal comprises a sequence of frames, with each frame containing representations of a plurality of audio channels and reconstruction parameters for upmixing the plurality of audio channels to a predetermined channel format. As such, method 1000 produces an encoded audio signal that may be decoded, for example, by any of the aforementioned methods. Method 1000 comprises steps S1010 and S1020 that may be performed for each reconstruction parameter (e.g., SPAR parameter) that is to be coded.

At step S1010, the reconstruction parameter is explicitly encoded (e.g., encoded non-differentially, or in the clear) once every given number of frames in the sequence of frames.

At step S1020, the reconstruction parameter is encoded (time-)differentially between frames for the remaining frames.

The choice whether to encode a respective reconstruction parameter differentially or non-differentially for a given frame may be made such that each frame contains at least one reconstruction parameter that is explicitly encoded and at least one reconstruction parameter that is (time-)differentially encoded with reference to an earlier frame. Further, to ensure recoverability in case of packet loss, the sets of explicitly encoded and differentially encoded reconstruction parameters differ from one frame to the next. For instance, the sets of explicitly encoded and differentially encoded reconstruction parameters may be selected in accordance with a group of schemes, wherein the schemes are cycled through periodically. That is, the contents of the aforementioned sets of reconstruction parameters may repeat after a predetermined frame period. It is understood that each reconstruction parameter is explicitly encoded once every given number of frames. Preferably, this given number of frames is the same for all reconstruction parameters.

Advantages

As partly outlined in the above sections, the following technical advantages over conventional technologies can be provided for PLC using the techniques described in this disclosure.

1. Provide reasonable reconstruction parameters (e.g., SPAR parameters) in case of packet losses in order to provide a consistent spatial experience based on, for example, the EVS concealment signals.
2. Mitigate inconsistent of lost audio data (e.g., EVS concealment) for long durations of lost packets
3. Provide best reconstruction parameters (e.g., SPAR parameters) after packet loss with time-differentially coding applied.

Interpretation

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Enumerated Example Embodiments

Various aspects and implementations of the present disclosure may also be appreciated from the following enumerated example embodiments (EEEs), which are not claims.

EEE1. A method of processing audio, comprising: determining whether a number of consecutive lost frames satisfies a threshold; and in response to determining that the number satisfies the threshold, spatially fading a decoded first order Ambisonics (FOA) output.

EEE2. The method of EEE1, wherein the threshold is four or eight.

EEE3. The method of EEE1 or EEE2, wherein spatially fading the decoded FOA output includes linearly interpolating between a unity matrix and a spatial target matrix according to an envisioned fade-out time.

EEE4. The method of any one of EEE1 to EEE3, wherein the spatially fading has a fade level that is based on a time threshold.

EEE5. A method of processing audio, comprising: identifying correctly decoded parameters; identifying parameter bands that are not yet correctly decoded due to missing time-difference base; and allocating the parameter bands that are not yet correctly decoded based at least in part on the correctly decoded parameters.

EEE6. The method of EEE5, wherein allocating the parameter bands that are not yet correctly decoded is performed using previous frame data.

EEE7. The method of EEE5 or EEE6, wherein allocating the parameter bands that are not yet correctly decoded is performed using interpolation.

EEE8. The method of EEE7, where the interpolation includes linear interpolation across frequency bands in response to determining that a last correctly decoded value of a particular parameter is older than a threshold.

EEE9. The method of EEE7 or EEE8, wherein the interpolation includes interpolation between nearest neighbors.

EEE10. The method of any one of EEE5 to EEE9, wherein allocating the identified parameter bands includes: determining previous frame data that is deemed to be good; determining current interpolated data; and determining whether to allocate the identified parameter bands using the previous good frame data or the current interpolated data based on metrics on how recent the previous good frame data is.

EEE11. A system comprising: one or more processors; and a non-transitory computer-readable medium storing instructions that, when executed by the one or more processors, cause the one or more processors to perform operations of any one of EEE1 to EEE10.

EEE12. A non-transitory computer-readable medium storing instructions that, when executed by one or more processors, cause the one or more processors to perform operations of any one of EEE1 to EEE10.

The invention claimed is:

1. A method comprising:

receiving an audio signal, the audio signal comprising a sequence of frames, each frame containing representations of a plurality of audio channels and reconstruction parameters for upmixing the plurality of audio channels to a predefined channel format;

generating a reconstructed audio signal in the predefined channel format based on the received audio signal, wherein generating the reconstructed audio signal comprises:

determining whether at least one frame of the audio signal has been lost; and if a number of consecutively lost frames exceeds a first threshold, fading the reconstructed audio signal to a predefined spatial configuration, wherein fading the reconstructed audio signal to the predefined spatial configuration involves performing a linear interpolation between a unit matrix and a target matrix indicative of the predefined spatial configuration, in accordance with a predefined fade-out time.

2. An apparatus comprising a processor and a memory coupled to the processor and storing instructions for the processor, wherein the processor is configured to:

receive an audio signal, the audio signal comprising a sequence of frames, each frame containing representations of a plurality of audio channels and reconstruction parameters for upmixing the plurality of audio channels to a predefined channel format;

generate a reconstructed audio signal in the predefined channel format based on the received audio signal, wherein generating the reconstructed audio signal comprises:

determining whether at least one frame of the audio signal has been lost; and if a number of consecutively lost frames exceeds a first threshold, fading the reconstructed audio signal to a predefined spatial configuration, wherein fading the reconstructed audio signal to the predefined spatial configuration involves performing a linear interpolation between a unit matrix and a target matrix indicative of the predefined spatial configuration, in accordance with a predefined fade-out time.

3. A non-transitory computer-readable storage medium storing a computer program comprising instructions that, when executed by a computing device, cause the computing device to:

receive an audio signal, the audio signal comprising a sequence of frames, each frame containing representations of a plurality of audio channels and reconstruction parameters for upmixing the plurality of audio channels to a predefined channel format;

generate a reconstructed audio signal in the predefined channel format based on the received audio signal, wherein generating the reconstructed audio signal comprises:

determining whether at least one frame of the audio signal has been lost; and if a number of consecutively lost frames exceeds a first threshold, fading the reconstructed audio signal to a predefined spatial configuration, wherein fading the reconstructed audio signal to the predefined spatial configuration involves performing a linear interpolation between a unit matrix and a target matrix indicative of the predefined spatial configuration, in accordance with a predefined fade-out time.

* * * * *